(12) United States Patent
Borodin et al.

(10) Patent No.: US 7,859,706 B2
(45) Date of Patent: Dec. 28, 2010

(54) METHOD AND APPARATUS FOR MODEL DRIVEN TESTING

(75) Inventors: Igor Borodin, Netanya (IL); Elad Ganot, Givatayim (IL); Ami Heitner, Netanya (IL); David Rachamim, Kfar HaNagid (IL); Ben F. D. Shaibe, Even-Yehuda (IL); Penina Weiss, Givat Shmuel (IL)

(73) Assignee: SAP Portals Israel Ltd., Ra'anana (IL)

( * ) Notice: Subject to any disclaimer, the term of this patent is extended or adjusted under 35 U.S.C. 154(b) by 1128 days.

(21) Appl. No.: 11/526,939

(22) Filed: Sep. 26, 2006

(65) Prior Publication Data

US 2008/0079961 A1    Apr. 3, 2008

(51) Int. Cl.
*G06F 15/00* (2006.01)
*G06F 17/50* (2006.01)
(52) U.S. Cl. .......................................... 358/1.18; 716/1
(58) Field of Classification Search ................. 358/1.18, 358/1.13, 1.14, 1.16, 1.15; 716/1, 3, 18; 235/472.01, 462.45, 462.14; 706/11, 47, 706/50; 717/104, 110, 113, 126
See application file for complete search history.

(56) References Cited

U.S. PATENT DOCUMENTS

| 5,996,012 | A  | * | 11/1999 | Jarriel .......................... 709/226 |
| 7,143,310 | B2 | * | 11/2006 | Gavish et al. .................. 714/25 |
| 2007/0100903 | A1 | * | 5/2007 | Cherry ......................... 707/201 |
| 2008/0244506 | A1 | * | 10/2008 | Killian et al. ................ 717/100 |

* cited by examiner

*Primary Examiner*—Saeid Ebrahimi Dehkordy
(74) *Attorney, Agent, or Firm*—Buckley, Maschoff & Talwalker LLC (57) ABSTRACT

A method and apparatus for providing information about a model of a test for an application, using an application model, the method comprising the steps of: providing a pre configuration of the application or a part thereof; providing a transformation parameter; and providing an at least one post configuration of the at least one application or a part thereof. Once the pre-configuration, transformation parameter of post-configuration are provide, a test description is generated, which can then be compiled to suit and testing tool or environment.

12 Claims, 6 Drawing Sheets

```xml
<?xml version="1.0"?>
<xg:Component urn="AADRL1" xmlns:xg="http://www.sap.com/visualcomposer/2005/xgl"
xmlns:ep="http://www.sap.com/visualcomposer/2005/xgl/portal">
    <xg:Data>
     <xg:Infosets>
       <xg:Singleton id="AAARL6">
         <xg:Object>
           <xg:String name="BANK_CTRY" kind="V/">
           <xg:Number name="MAX_ROWS" kind="V/">
         />xg:Object>
       />xg:Singleton>
       <xg:Array id="AAARLA">
         <xg:Object>
           <xg:String name="BANK_CTRY" kind="R/">
           <xg:String name="BANK_KEY" kind="R/">
           <xg:String name="BANK_NAME" kind="R/">
           <xg:String name="CITY" kind="R/">
         />xg:Object>
       />xg:Array>
     />xg:Infosets>
     <xg:Infoactors>
       <id="ADARL2" systemType="SAPFactory" functionName="BAPI_BANK_GETLIST">
         <xg:Inports>
           <xg:Inport infoset="AAARL3" name="INPUT/">
         />xg:Inports>
         <xg:Outports>
           <xg:Outport infoset="AAARL4" name="RETURN/">
           <xg:Outport infoset="AAARL5" name="BANK_LIST/">
         />xg:Outports>
       />ep:SAPFunction>
     />xg:Infoactors>
    />xg:Data>
    <xg:Controller>
     <xg:Actions>
       <xg:Action name="SUBMIT" scope="ACARL6/">
       <xg:Action name="SELECT" scope="ACARL6/">
       <xg:Action name="SELECT" scope="ACCRLA/">
     />xg:Actions>
     <xg:Relays>
     />xg:Relays>
     <xg:ExecutionPlans>
       <xg:Plan id="AFP101" action="SUBMIT" scope="ACARL6" priority="1">
         <xg:Map source="AAARL6" target="AAARL3" index="1">
           <xg:Assign field="BANK_CTRY" value="@BANK_CTRY"
                  value.refs="BANK_CTRY"/>
           <xg:Assign field="MAX_ROWS" value="@MAX_ROWS"
                  value.refs="MAX_ROWS/">
         />xg:Map>
       />xg:Plan>
     />xg:ExecutionPlans>
    />xg:Controller>
</xg:Component>
```

- 304: Singleton AAARL6 block
- 308: Array AAARLA block
- 312: Infoactors block
- 316: Plan AFP101 block

```
<?xml version="1.0" encoding="UTF-8"?>
<tg:TestActors xmlns:tg="http://www.sap.com/visualcomposer/2005/tgl"
            dataFile="TestData01">
<tg:TestActor
        executionPlan="/xg:Component/xg:Controller/xg:ExecutionPlans/
                    xg:Plan">
        <tg:Input>
            <tg:FormView id="ACARL6">
                <tg:Field>BANK_CTRY/>tg:Field>
                <tg:Field>MAX_ROWS/>tg:Field>
            />tg:FormView>
        />tg:Input>
        <tg:Output>
            <tg:GridView id="ACCRLA">
                <tg:Field>BANK_CTRY/>tg:Field>
            />tg:GridView >
        />tg:Output>
    />tg:TestActor>
/>tg:TestActors>
```

Fig. 5

Country_1=DE
MaxRows_1=5

METHOD AND APPARATUS FOR MODEL DRIVEN TESTING

CROSS-REFERNCES TO RELATED APPLICATIONS

The present application relates to U.S. patent application Ser. No. 11/324,155 titled EXECUTABLE AND DECLARATIVE SPECIFICATION FOR GRAPHICL USER INTERFACES, filed Dec. 29, 2005, which claims priority from U.S. Provisional Application Ser. No. 60/722,888 filed Sep. 30, 2005, the entire contents of which are hereby expressly incorporated by reference.

BACKGROUND OF THE INVENTION

1. Field of the Invention

The present invention relates to a method for automatic software testing in general, and to a method and apparatus for automatically generating and performing tests associated with an application, in particular.

2. Discussion of the Related Art

Testing, or quality assurance of applications, is an inseparable part of the development process. Software testing is required to test all the possible uses of an application, on all types and combinations of data or environments, whether they are of high probability to occur or not. The diligence is required to ensure coverage of the product, i.e. discovering and possibly repairing as many as possible problems and failures of the application, as early as possible. Best practiced quality assurance should accompany a product along all its life cycle phases, including design, development, pre deployment, post deployment and as a customer service tool for reconstructing customer-reported problems. Different tests might be planned for each phase, in order to cover the different aspects and functionality that have to be tested at that phase. However, the time and manpower resources dedicated to testing are not always sufficient, which may cause suboptimal quality of the products. In addition, the testing is sometimes monotonous and tedious, thus causing a human quality tester to omit, change or otherwise perform tests in an inconsistent manner. Another problem results from long execution times of tests, which result in lack of agility when the application or the testing has to be changed.

Automatic testing tries to overcome these problems by assuring that all tests are performed as planned, thus improving the coverage and quality as well as saving manpower resources. Currently existing systems record executions of an application, storing inputs and actual results, or receive the description of the tests as designed or performed by a human and later rerun the tests and expect to receive the same results. However, automatic testing suffers from a number of drawbacks. A substantive development effort has to be put into generating a thorough test script that will cover all areas and all functionality of the application. In addition, test scripts are sensitive to changes in the application. Even minor changes such as changing the text or the location of a control cause most test scripts not to recognize a previous test and thus are unable to perform the test. In such cases, changing and regenerating the test script is required for adapting the tests to the modified application. Yet another drawback relates to the test being linked to a specific run-time platform or tool, such as Mercury QTP manufactured by Mercury (http://www.mercury.com), or to a specific runtime environment, such as Flash, HTML, Adobe Flex or others. Porting a test script to another tool or another environment requires effort which is similar to the initial generation. An additional drawback relates to a test being coupled to a specific test data, which generally does not enable customer specific settings, which in turn harms the thoroughness of the test and hence the product's quality. Yet another drawback of these methods results from the tests being planned and designed by human beings, and thus being vulnerable to possible incompleteness, meaning that the collection of tests might not cover all possible activities in the system, and miss possible failure points.

There is therefore a need for a method and apparatus for test generation and execution for applications. The method and apparatus should be independent of the used testing platforms and runtime environments, and the designed tests should be easily adapted to changes in an application, without requiring manual changing by a user.

SUMMARY OF THE PRESENT INVENTION

It is an object of the present invention to provide a novel method for providing an automatic generation of a testing model for an application, based on a model of the application. The test model is coupled with the application model, thus providing for automatic changes in the testing plan when the application changes.

There is thus provided in accordance with an exemplary embodiment of the present invention a method for generating a model of a test, the model coupled to an at least one model of an at least one part of an at least one application, the method comprising the steps of receiving one or more pre configuration attributes of a part of an application; receiving one or more transformation parameters; receiving one or more post configuration attribute of the part of the application; and generating a model of a test, using at least one of the pre configuration attributes; or the transformation parameter; at least one of the post configuration attributes. Within the method, the application optionally comprises one or more actors, and one of the pre configuration attributes, or the transformation parameter or one of the post configuration attributes refer to the actor. The method optionally comprises a step of compiling the model of a test into one or more testing product. Within the method, the step of providing the transformation parameter optionally comprises one or more of the group consisting of: simulating a test scenario; supplying expected data by running a second application model; entering an expression or a condition; or entering a behavior model. The expression or the condition can be a combination of one or more of the group consisting of: a regular expression; a loop; a counter; a while construct; or an if-then construct. The model of a test can be represented as a tGraph file. The testing product is optionally a test script, or the testing product is designed to work with testing platform or with a runtime environment.

Another aspect of the disclosed invention relates to an apparatus for generating an at least one testing product for an at least one part of an at least one application modeled by an at least one application model, the application model comprising one or more actors, the apparatus comprising: a logic component for associating an actor with an attribute related to a test; a test model generator for generating a model of a test, the model of a test coupled with a model of the at least one part of the at least one application; and a user interface component. Optionally, the apparatus further comprises a component for interfacing the apparatus to an application development environment. Optionally, the apparatus further comprises a component for generating a testing product from the test model.

Yet another aspect of the disclosed invention relates to a computer readable storage medium containing a set of instructions for a general purpose computer, the set of instructions comprising: receiving one or more pre configuration attributes of a part of an application; receiving one or more transformation parameters; receiving one or more post configuration attributes of the part of the application; and generating a model of a test, the model of a test is coupled with a model of the at least one part of the at least one application, using at least one of the following: one of the pre configuration attributes; one of the transformation parameters; or one of the post configuration attributes.

BRIEF DESCRIPTION OF THE DRAWINGS

The present invention will be understood and appreciated more fully from the following detailed description taken in conjunction with the drawings in which:

FIG. 3 is a listing of an xGraph file, describing the model of FIG. 2, in accordance with the preferred embodiment of the present invention;

DETAILED DESCRIPTION OF THE PREFERRED EMBODIMENT

The present invention overcomes the disadvantages of the prior art by providing a novel method and apparatus for model based application testing, which enable automatic generation and adaptation of tests.

The present invention provides the generation of automatic test products, associated with a model of an application. In accordance with a preferred embodiment, given a model of an application, which was preferably developed using a model driven development environment, a testing product is generated from the application model. A model driven application design is described in U.S. patent application Ser. No. 11/324, 155 titled EXECUTABLE AND DECLARATIVE SPECIFICATION FOR GRAPHICL USER INTERFACES, filed Dec. 29, 2005, the full contents of which are hereby incorporated. An application model is preferably a generic executable specification of graphical user interfaces for business applications. The application model is written using a declarative specification language that provides a self-contained, closed, and deterministic definition of all aspects of a graphical user interface in a device- and programming-language independent manner. The application model semantics are defined using an abstract model of a GUI framework. Framework-specific code generators or interpreters are employed in order to turn an application model into executable runtime code. An application model comprises one or more actors, wherein an actor is an entity that transforms the model from one configuration to another, and one or more execution plans describing possible flows of the application. Given an application model, the testing product is defined by providing testing information to the application model which describes one or more sets comprising: a pre-configuration of the model, a transition event and a post-configuration of the model. Thus, the testing information is preferably characterized by one or more of the following attributes: pre-state, input, action and output. All of the provided attributes are tested during the testing phase of the application according to the details as determined and supplied by the test developer. A testing product, such as a test script for validating the model configuration transformation as described by the supplied attributes is generated for the application. An example of an application model is described in U.S. patent application Ser. No. 11/324,155 titled EXECUTABLE AND DECLARATIVE SPECIFICATION FOR GRAPHICL USER INTERFACES, filed Dec. 29, 2005, wherein an XGL (an XML dialect) file is generated for each application model, generally referred to as xGraph. However, the XGL implementation of an xGraph is exemplary only, and alternative embodiments can be used to model an application, including a plain text file. Analogously to XGL, a tXGL is also an exemplary embodiment for a testing model, generally referenced as tGraph, and related to one or more actors. tXGL is also a dialect of XML. Alternative embodiments can be implemented or used without departing form the spirit of the current invention. tXGL is also a derivative of XML and can be generated to complement the XGL with relevant testing information for one or more actors. The tXGL, in an analogous manner to the XGL is then compiled to generate a testing product such as a test script for any supported test tool, such as QTP Test manufactured by Mercury (http://www.mercury.com) or others currently known or that will become known in the future, and for any runtime environment, such as HTML, Flex, or others. The testing output can alternatively be an executable that runs one or more tests and produces output.

The data to be used for each tested attribute of each actor can be generated in a variety of ways. Once the desired content is entered by the test developer, preferably using a graphical user interface, a test model such as a tGraph file can be generated and later compiled, preferably for a certain test tool or a certain runtime environment. The ways to enter data or characteristics into an attribute of an actor include: 1. Simulating a test scenario, wherein the data and flow are recorded or otherwise stored for later retrieval during automatic testing. For example, the name of a predetermined state is entered, and the system should repeat entering the same name during testing. 2. Supplying expected data by running another model that will perform additional actions or external checks. For example, the system can use another program to supply a list of possible inputs for a field, and will run the program on these inputs sequentially. Alternatively the system may check the balance of a customer to be between externally supplied acceptable limits. 3. Entering one or more expressions or conditions, including counters, regular expressions, loops, a condition construct such as an if-then or a while construct, or the like. For example, the system can test a certain calculation for each integer X between 1 and 10, or repeat a certain test for Y times. The expressions are inserted into one or more fields instead of parameters. 4. Entering a behavior model, i.e., a specifically written code that generates the expected output and tests the actual output against the expected output. For example, the external model can fetch the capitol of a state from an external source and compare it to the capitol as received from the application. While option 1 is suitable for smaller quantities of data, options 2, 3, and 4 are suitable for larger quantities that necessitate automation. Option 2 provides the usage of external input or checks, while options 3 and 4 enable the test developer to automatically program and check the logic of the application.

Figure 1:
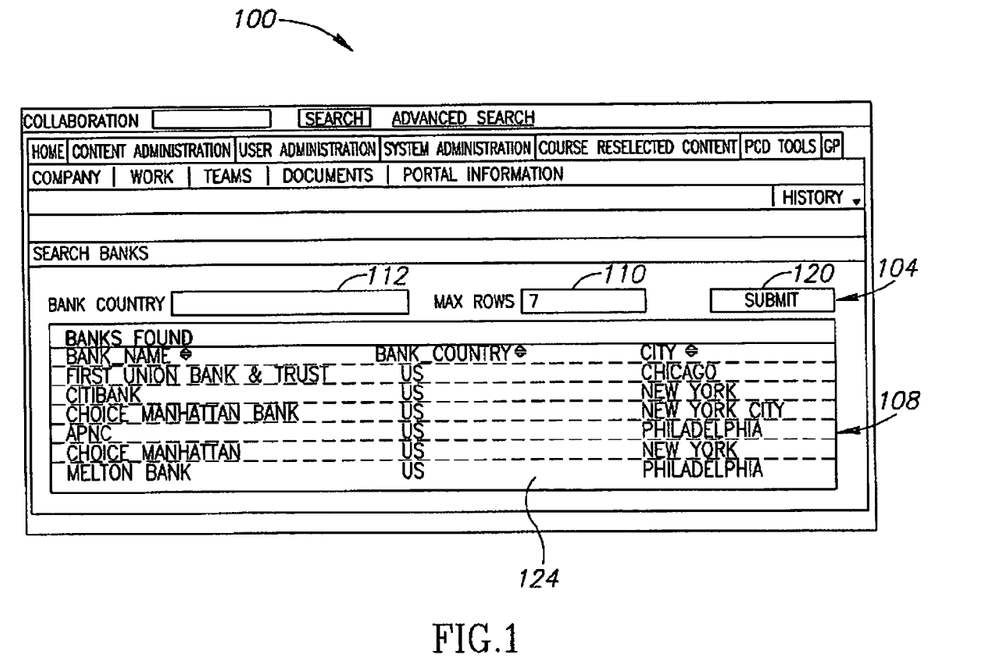
FIG. 1 is a schematic illustration of an application.
Figure 2:
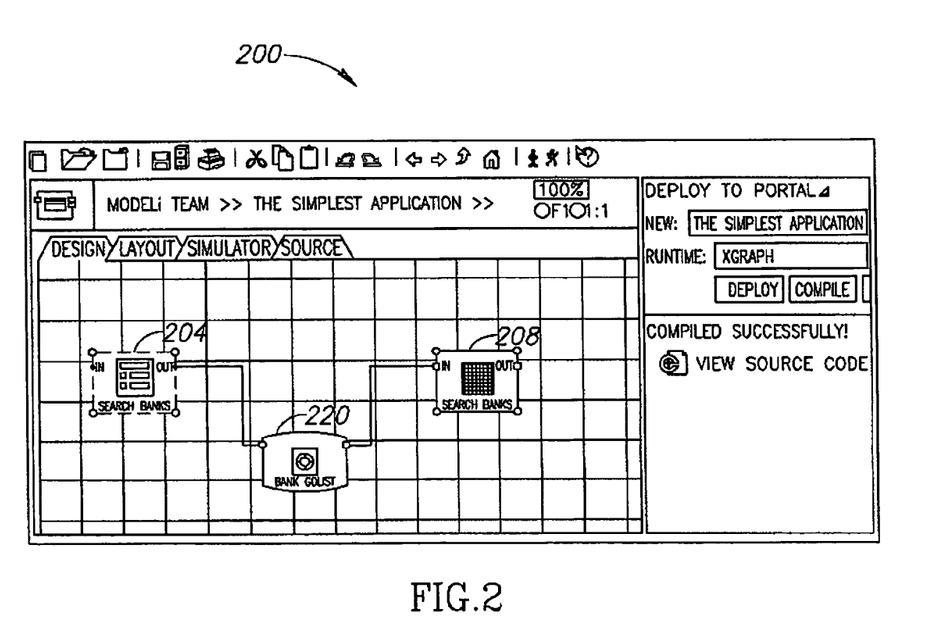
FIG. 2 is a schematic illustration of a model of the application of FIG. 1, in accordance with the preferred embodiment of the disclosed invention.

Referring now to FIG. 1, showing a schematic illustration of an exemplary application, to FIG. 2, showing a schematic illustration of a model of the application of FIG. 1, and to FIG. 3, showing the xGraph associated with the application of FIG. 1. An xGraph can be implemented in any declarative description format, such as but not limited to an XML file, a plain text file, or others. FIG. 1 shows a simple application, running on a computing platform, such as a server, a personal computer, a mainframe computer, or any other type of computing platform that is provisioned with a memory device, a CPU or microprocessor device, and several I/O ports (not shown). The computing platform executes instruction codes and uses data necessary for carrying out the methods of the disclosed invention. The application shown in FIG. 1, generally referred as 100, wherein the user enters details at input area 104 and receives the results at output area 108. The user enters a country name at text box 112, and a maximal number of rows at text box 116. Upon clicking on submit button 120, a list of banks associated with the country of text box 112, wherein the length of the list is at most the number entered in text box 116, is displayed in table 108, wherein the name of the country appears in column 124. FIG. 2, shows the model upon which the application in FIG. 1 was constructed. The text fields of area 104 of FIG. 1 are described as SearchBanks actor 204, area 108 is described as a BanksFound actor 208, and submit button 120 is described as actor 220, responsible for fetching the banks according to details in actor 204 and presenting them at actor 208. FIG. 3 shows relevant parts of the xGraph file, i.e., the XML-like description of the application shown in FIG. 1. Code lines 304 relate to area 104 of FIG. 1 wherein the user has to enter the query details, lines 308 relates to area 108 of FIG. 1 in which the bank list is displayed, lines 312 relate to the code being executed when the user hits Submit button 120, and lines 316 relate to an execution plan of the application.

Figure 4:
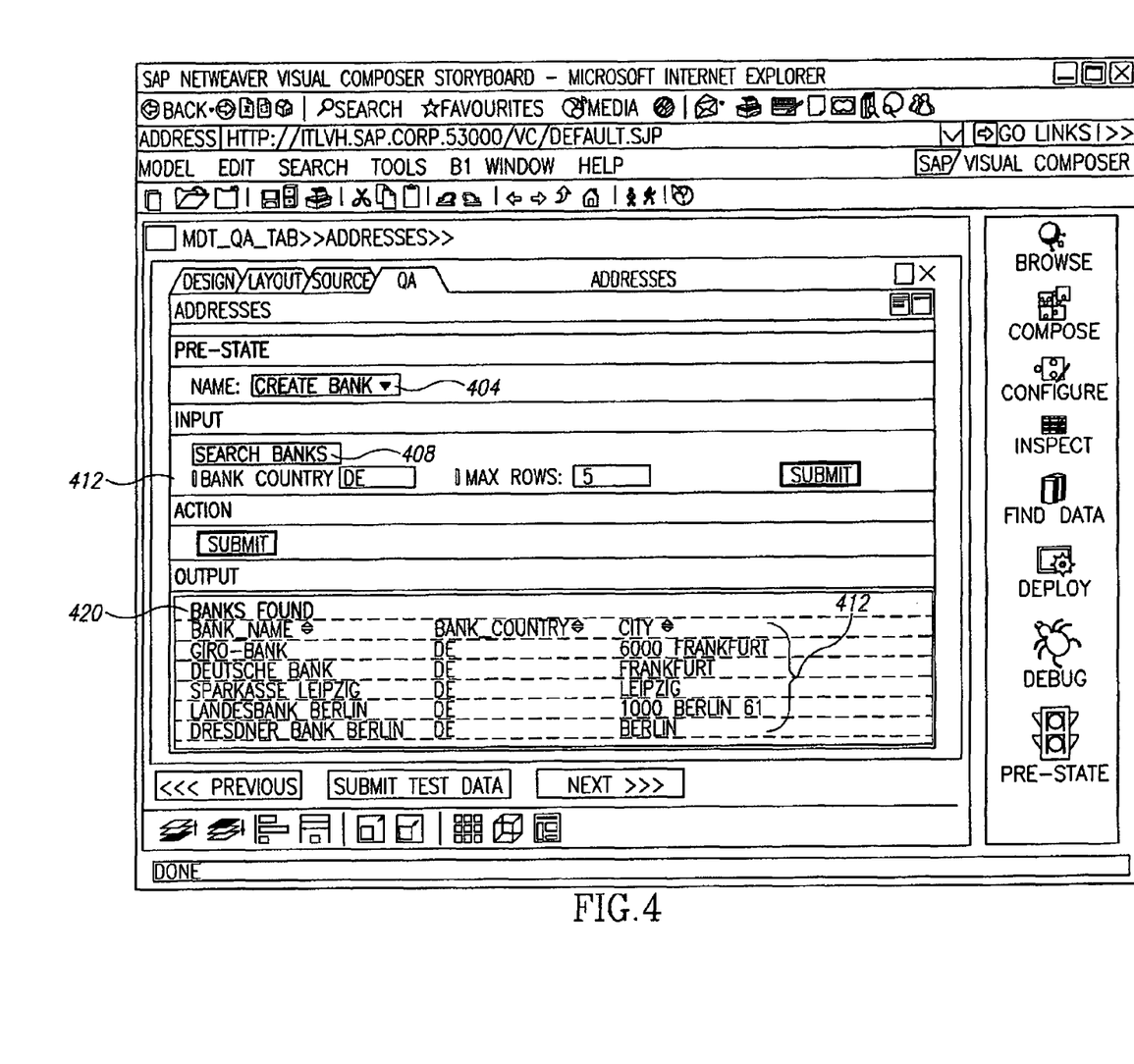
FIG. 4 is a schematic illustration of the options given to a testing developer of the application of FIG. 1.

Referring now to FIG. 4, showing the available testing options for the application of FIG. 1. The testing options include a pre-state area 404, an input area 402, an action area 416 and an output area 420. Pre-state area 404 is designed to support an operation that may include setup, verification of an initial pre condition, clean-up or any other operation that is not directly related to the action of the application itself. Since the input of the application is received through area 108 of FIG. 1, which is associated with SearchBanks actor 204 of FIG. 2, the option to input data to the testing phase is also associated with SearchBanks 408. In text field 412 the user entered manually DE as the name of the country and 5 as the maximal number of rows. However, the user could also instruct the testing to fetch a list of countries from an external source, to set a number of rows that varies between two numbers, and test for all these possibilities, or the like. In action area 416 the user can associate action button 120 of FIG. 1 with one or more execution plans, as detailed in association with FIG. 5 below. In output area 416, the test developer inserts a number of relevant banks and their properties, and expects to receive the same results when the program runs. As detailed above, the data associated with each attribute can be either entered manually as shown in FIG. 4; entered as a result of an external engine; designated as an expression or a condition; or write specific code that generates the expected output and tests the actual output against the expected output.

Figure 5:
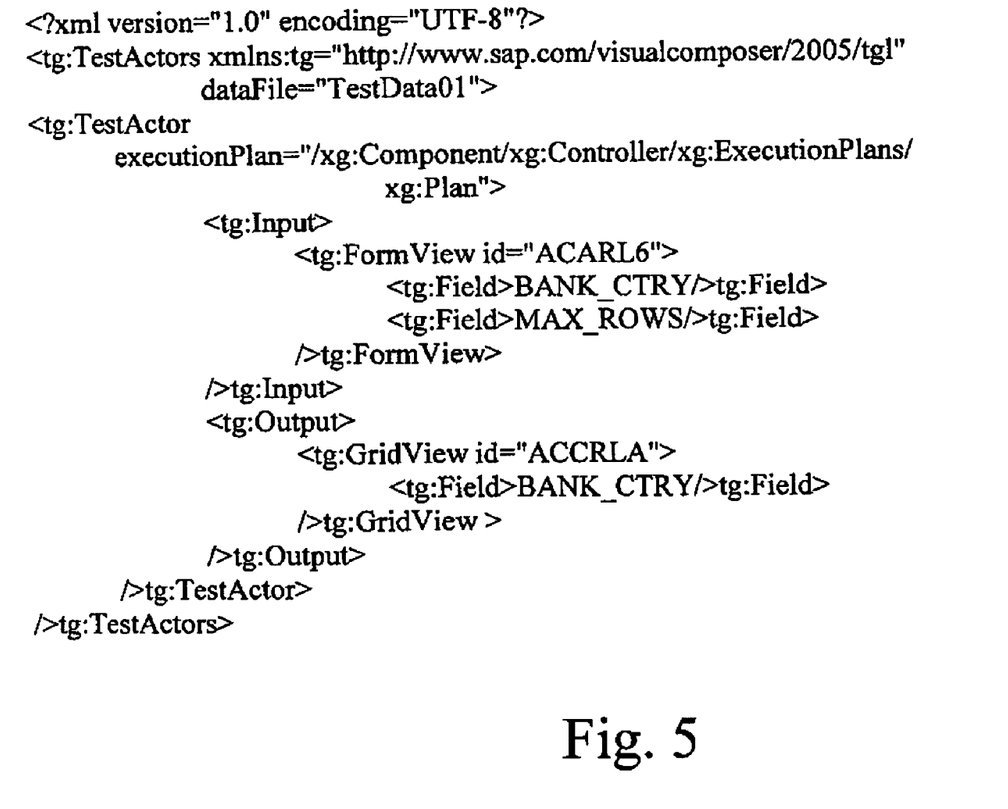
FIG. 5 is a listing of a tGraph file, describing the testing of the model of FIG. 2, in accordance with the preferred embodiment of the present invention.
Figure 6:
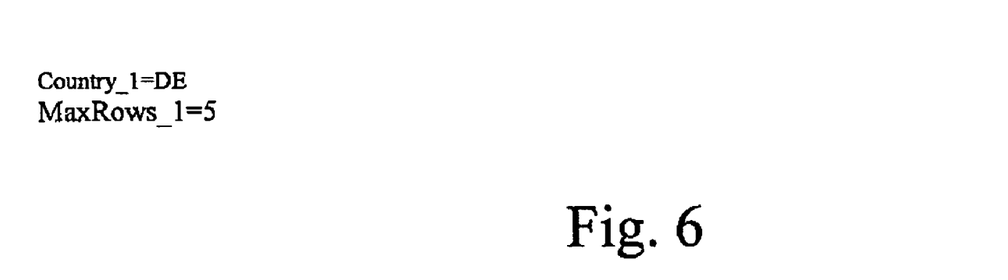
FIG. 6 is a listing of a data file, in accordance with the preferred embodiment of the present invention.

Referring now to FIG. 5, showing a listing of an exemplary tXGL file associated with testing the application of FIG. 1, and FIG. 6 which shows a sample test data, meaning that the shown files demonstrate the concept and general idea of a test model. A shown in line 504, the data for testing the application is to be taken from file TestData01, the contents of which are shown in FIG. 6, and the execution plan referred to in line 508 refers to the only execution plan listed in the XGL file shown in lines 316 in FIG. 3 above. The combination of the XGL shown in FIG. 3, and the tXGL shown in FIG. 5 provide a full description of the functionality and testing of the application. It will be appreciated by a person skilled in the art, that due to the construction of the testing, the test plan is oblivious, for example, to the location or the text associated with an element of the application, and changing any of them should not and will not cause any change in the testing. The only step that might be required is regeneration and recompilation of the TGraph.

Figure 7:
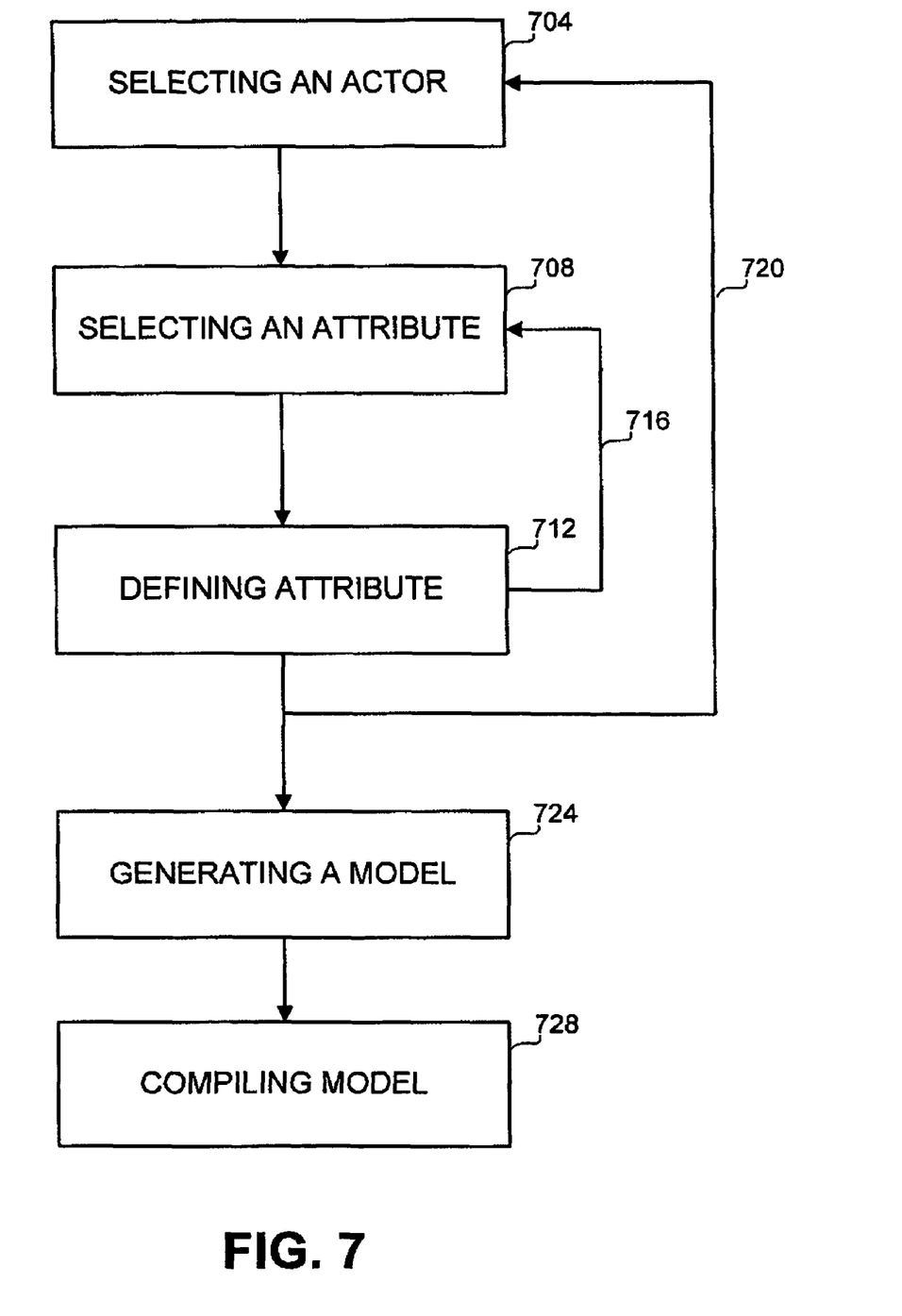
FIG. 7 is a flowchart showing the main steps of a preferred embodiment of a method of the present invention.

Referring now to FIG. 7, showing a flowchart of the main steps of a preferred embodiment of a method of the present invention. The method starts at step 704 with a user, selecting an actor from a model of an application, the functionality of which it is required to test, thus preferably preparing to test a one or more steps in the application. If the application contains just one actor, there is no such choice and the application is tested as a whole. The user may be a test developer or optionally the application developer. The user can also be a test developer associated with the customer of the application, who wishes to test the application on their own data. However, this is not a limitation and the user can also be any person familiar with the application, or even a third party. At step 708 the user selects one or more attributes of the actor to be tested. Each attribute can be any of the following: the pre-state, the input, the action, or the output associated with the actor or with the model. The pre-state is a pre-configuration associated with the actor or with the application, the post-state is a post-configuration associated with the same, and the action is a transformation parameter for transforming the application or the actor from the pre-configuration the post-configuration. Alternatively, additional attributes can be required and enabled for the user to select. The pre-configuration, action and post-configuration are mandatory for each test, but the user is not required to define them in any particular order. The pre-state is a condition which the actor has to meet in order to be considered in an acceptable or stable state prior to the testing. For example, it can be asserted that a text field is empty or contains a default character string. The input attribute relates to the data that is to be entered for testing the actor, the output attribute relates to the expected result, and the action relates to the connection between the input and the output. At step 712 the user defines specific data or characteristics for the attribute selected at step 712. The data or characteristics can be defined in a variety of ways, including but not limited to the following ways: 1. Simulating a test scenario, wherein data and flow are recorded or otherwise stored by an apparatus of the disclosed invention, for later retrieval during automatic testing. 2. Supplying expected data as the output of running another model that will perform additional actions or external checks. 3. Entering expressions or conditions, including counters, regular expressions, loops, constructs such as if-then, if-then-else or while constructs, or the like. 4. Entering a behavior model, i.e., a specifically written code that generates the expected output and tests the actual output against the expected output. The steps of selecting and defining one or more attributes can be repeated as shown by arrow 716 for additional attributes within an actor, and the steps of selecting an actor, and selecting and defining one or more attributes can be repeated as shown by arrow 720 for additional actors. Once all actors and all attributes of each actor are defined, at step 724 a test model generator is run to produce a test model, such as a tXGL out of the defined actors and attributes, by transforming the test data associated with the model into an XML file. The exemplary tGraph generator is analogous to the xGraph generator detailed in U.S. patent application Ser. No. 11/324,155 titled EXECUTABLE AND DECLARATIVE SPECIFICATION FOR GRAPHICL USER INTERFACES, filed Dec. 29, 2005. Once the tGraph is generated, it can be compiled into a testing product, such as a test script, an executable, or another output that enables the testing of the application, independently or in conjunction with a testing tool. The testing product can comply with one or more testing tools or one or more runtime environments.

Figure 8:
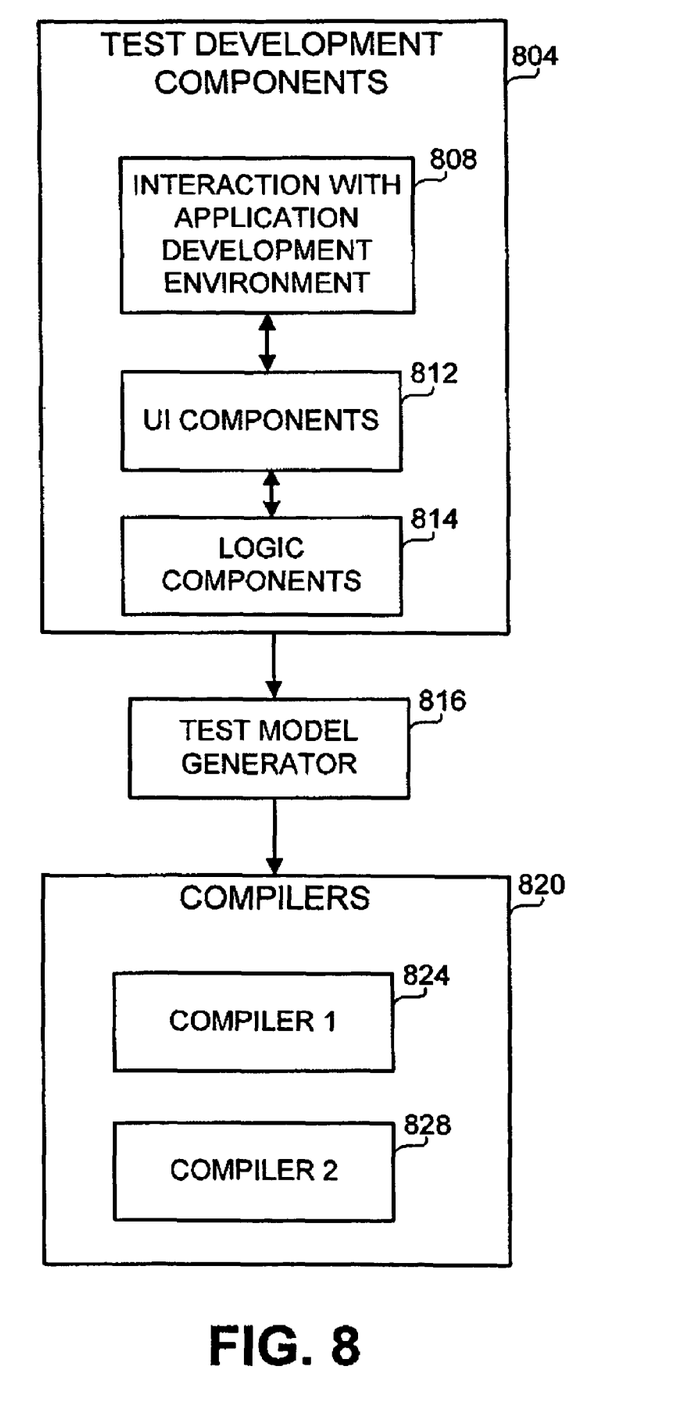
FIG. 8 is a block diagram of the main components of a preferred embodiment of an apparatus of the present invention.

Referring now to FIG. 8, showing a block diagram of the main components of an apparatus in accordance with the preferred embodiment. The components may be implemented as software executables, modules, libraries, DLLs or other units, preferably implemented as software. The division of the current system to blocks is exemplary only and alternative designs can be implemented without deviating from the spirit of the disclosed invention. The apparatus is comprised of test development components 804, a test model generator 816 and compilers 820. Test development components 804 comprises an at least one component for interacting with application development environment 808, wherein the development environment can be, for example Visual Composer by SAP (www.sap.com). Any of interaction components 808 can be external to the environment, implemented as a plug-in or otherwise cooperate with the environment. Test development components 804 further comprise UI components 812 that provide the user interface necessary for carrying out the methods of the disclosed invention, including providing the user with an option to enter and possibly check regular expressions, the option to enter testing expressions, option to select from files, lists or other factors or the like. Test development components 804 comprises also logic components 814 for suggesting the relevant options for the actors of the model, in order to associate one or more of the actors with one or more of the attributes related to a test, including pre-state, input, action or output. When the test developer finished developing a test model, test model generator 816 is activated, to generate a model or a test description that represents the testing schemes, such as a tGraph. The test model is tightly coupled to, and complements the application model. For example, when a model is represented by an xGraph, the testing model can be represented by a tGraph which may reside in the same, in a complementary, or in a different file from the xGraph. Once the test model is generated, the testing application is compiled by one or more compilers of compilers 820. Each compiler optionally generates a testing product such as a test script or an executable, suitable for one or more testing platforms and one or more runtime environments. Compilers 820 may comprise a separate component such as compiler 1 (824) or compiler 2 (828) for a specific combination of one or more testing platforms or one or more runtime environment, a single compiler with different activation options for each combination, or any combination thereof.

The disclosed method and apparatus provide a solution for the problems posed by conventional automatic testing tools, through providing a test development environment that is preferably linked to a model of an application. Thus, the generated tests are not affected by small changes to the application, which do not require changes in the designed testing, and furthermore are independent of the testing tools or the runtime environments in which they will be used. Thus, the same tests definitions can be used for generating an updated test model, and the same test model need only be recompiled in order to be used with different testing platforms or different runtime environments.

It will be appreciated by a person skilled in the art that the disclosed techniques and structure are exemplary only, and that further ones can be implemented and used. For example, additional ways for entering or checking data with which the application is to be tested may be designed, different levels of automation for associating input, output or action with a certain actor can be used, or the like.

It will be appreciated by persons skilled in the art that the present invention is not limited to what has been particularly shown and described hereinabove. Rather the scope of the present invention is defined only by the claims which follow.

The invention claimed is:

1. A method for generating a model of a test, the model coupled to an at least one model of an at least one part of an at least one application, the method comprising the steps of:
   receiving an at least one pre configuration attribute of the at least one part of the at least one application;
   receiving an at least one transformation parameter, wherein the transformation parameter is associated with at least one of simulating a test scenario, supplying expected data by running a second application model, entering an expression or a condition, or entering a behavior model;
   receiving an at least one post configuration attribute of the at least one part of the at least one application; and
   generating a model of a test using at least one of the following: the at least one pre configuration attribute; the at least one transformation parameter; the at least one post configuration attribute.

2. The method of claim 1 wherein the at least one application comprises an at least one actor, and wherein the at least one pre configuration attribute or the least one transformation parameter or the at least one post configuration attribute refer to the at least one actor.

3. The method of claim 1 further comprising a step of compiling the at least one model of a test into an at least one testing product.

4. The method of claim 3 wherein the at least one testing product is a test script.

5. The method of claim 4 wherein the at least one testing product is designed to work with an at least one testing platform.

6. The method of claim 4 wherein the at least one testing product is designed to work with an at least one runtime environment.

7. The method of claim 1, wherein the at least one expression or the at least one condition is a combination of one or more of the group consisting of: a regular expression; a loop; a counter; a while construct; or an if-then construct.

8. The method of claim 1 wherein the at least one model of a test is represented as a tGraph file.

9. An apparatus for generating an at least one testing product for an at least one part of an at least one application modeled by an at least one application model, the application model comprising an at least one actor, the apparatus comprising:
   an at least one logic component for associating the at least one actor with an at least one attribute related to a test, wherein the attribute is transformation parameter associated with at least one of simulating a test scenario, supplying expected data by running a second application model, entering an expression or a condition, or entering a behavior model;

an at least one test model generator for generating an at least one model of a test, the model of a test coupled with a model of the at least one part of the at least one application; and an at least one user interface component.

10. The apparatus of claim 9 further comprising an at least one component for interfacing the apparatus to an at least one application development environment.

11. The apparatus of claim 9 further comprising an at least one component for generating an at least one testing product from the at least one model of a test.

12. A non transitory computer readable storage medium containing a set of instructions for a general purpose computer, the set of instructions comprising:

receiving an at least one pre configuration attribute of an at least one part of an at least one application;

receiving an at least one transformation parameter, wherein the transformation parameter is associated with at least one of: simulating a test scenario, supplying expected data by running a second application model, entering an expression or a condition, or entering a behavior model;

receiving an at least one post configuration attribute of the at least one part of the at least one application; and generating a model of a test, the model of a test is coupled with a model of the at least one part of the at least one application, using at least one of the following: the at least one pre configuration attribute; the at least one transformation parameter; the at least one post configuration attribute.

* * * * *